United States Patent [19]

Smith

[11] Patent Number: 5,287,683

[45] Date of Patent: Feb. 22, 1994

[54] SWEEP CUT TRIMMER MOWER AND CONVERTING PLATFORM

[76] Inventor: Walker M. Smith, 2505 Gold Cup La., Reston, Va. 22091

[21] Appl. No.: 1,341

[22] Filed: Jan. 7, 1993

Related U.S. Application Data

[63] Continuation-in-part of Ser. No. 931,823, Aug. 18, 1992, abandoned.

[51] Int. Cl.⁵ .............................................. A01D 67/00
[52] U.S. Cl. ..................................... 56/12.7; 56/16.7; 56/17.2
[58] Field of Search ..................... 56/12.1, 12.7, 17.2, 56/16.7, 473.5, DIG. 9; 280/47.38, 33.994; 16/35 R

[56] References Cited

U.S. PATENT DOCUMENTS

| | | | |
|---|---|---|---|
| 3,828,392 | 8/1974 | Bolger | 16/35 R |
| 4,182,100 | 1/1980 | Letter | 56/16.7 |
| 4,287,709 | 9/1981 | Lowry et al. | 56/17.5 |
| 4,411,126 | 10/1983 | Lowry et al. | 56/12.7 |
| 4,688,376 | 8/1987 | Wolfe | 56/17.5 |
| 4,756,147 | 7/1988 | Savell | 56/17.5 |
| 4,845,929 | 7/1989 | Kawasaki et al. | 56/17.5 |
| 4,922,694 | 5/1990 | Emoto | 56/12.7 |
| 5,095,687 | 3/1992 | Andrew et al. | 56/12.7 |

FOREIGN PATENT DOCUMENTS 1551622 8/1979 United Kingdom ................. 56/12.7

Primary Examiner—Mark Rosenbaum
Assistant Examiner—John M. Husar
Attorney, Agent, or Firm—Whitham & Marhoefer

[57] ABSTRACT

A line trimmer is converted to a lawn trimmer/mower so that it can be used to mow areas of grass like a conventional mower; however, the line trimmer retains its functionality as a line trimmer and edger. The conversion device is a wheeled platform that holds the cutting assembly at a specified height above a lawn. The platform has an opening in its forward portion for the intake of grass and weeds and the exhaust of clippings. The opening also serves the functions of allowing the user to see the cutting line to determine when more should be advanced, allowing the line trimmer to be moved next to objects in a lawn for trimming weeds and grass, and allowing the line trimmer to be rotated to a horizontal orientation where edging can be performed. The wheels are preferably multidirectional so that the line trimmer can be swept across the lawn in a semi-circular pattern. Locking mechanisms associated with the wheels allow the sweeping motion to be performed more comfortably and quickly. A means is provided for orienting the shaft of a line trimmer at different locations relative to the opening in the platform so that the platform can be comfortably moved back and forth parallel to a wall or fence.

11 Claims, 5 Drawing Sheets

SWEEP CUT TRIMMER MOWER AND CONVERTING PLATFORM

CROSS-REFERENCE TO RELATED APPLICATIONS

This patent application is a continuation-in-part patent application of the co-pending patent application of the same inventor having Ser. No. 07/931,823, filed Aug. 18, 1992 now abandoned, and the complete contents of that patent application is herein incorporated by reference.

DESCRIPTION

Background of the Invention

1. Field of the Invention

The invention generally relates to lawn care and, more particularly, to a wheeled platform for allowing a conventional line trimmer to be used as both a lawn trimmer and a lawn mower without inhibiting or reducing its original trimming and edging functionality.

2. Description of the Prior Art

Power line trimmers, which are commonly referred to as "weed eaters", have long been used for trimming weeds growing adjacent buildings, trees, posts and other places that conventional lawn mowers cannot reach. Line trimmers typically comprise an elongated shaft having a handle at a top end and a cutting assembly connected at a bottom end. The cutting assembly comprises a length of line, usually nylon filament, extending from a spool. The spool is rotated at high speeds by either an electric motor connected directly to the spool or by a small gasoline engine connected to the spool by a drive cable routed through the shaft. A semi-circular safety guard is normally attached directly over the cutting assembly to shroud the rotating filament from the user's legs and feet, and also prevents injury from flying objects.

Line trimmers have become extremely popular because of the many different functions they fulfill. For example, in the past, trimming weeds near buildings, trees and posts has been done with manual and electric clippers. In addition, in the past, edging near sidewalks, streets and driveways has been done with manual and electric edgers. The line trimmer has the practical advantage that it fulfills both trimming and edging functions. Furthermore, line trimmers have the advantage that they can often perform trimming and edging faster than clippers and edgers.

When a person is operating the line trimmer to trim weeds or grass in particular areas of a lawn, the trimmer is held with both hands and the cutting assembly is swept back and forth in a sweeping, semi-circular pattern. As this is done, the rotating line severs the weeds or grass to the desired length. When trimming around an object in the lawn such as a post or tree, it is recommended to slightly angle the rotating line such that it just brushes the object and does not hit it head on. Angling the cutting assembly reduces the drag on the line. In addition, angling the cutting assembly near a post or tree reduces the chances of marring painted surfaces or tree bark.

Line trimmers are not suitable for evenly cutting large areas of grass or weeds. Because the cutting height is determined by the level above the ground at which the user holds the rotating cutting assembly, cutting large areas of grass or weeds would require the user to hold trimmer at precise level for a long period of time. Fatigue will likely cause the user to change the level at which he or she holds the line trimmer. This change in the level of the line trimmer results in a unevenly cut lawn that looks unmanicured. Moreover, the user could accidently drop the cutting assembly to the ground which could severely damage the turf by scalping the grass right at its base. Besides fatigue, the grass or weeds could exert a drag on the line which causes the height the cutting assembly is positioned above ground to change.

Recently, a number of people have attempted to adapt line trimmers so that they can function more like a conventional lawn mower. In this way, owners of small-sized lots, such as townhouse and condominium dwellers, could use a line trimmer to evenly cut the entire lot with a line trimmer without the expense or storage requirements of a conventional lawn mower. Professional landscaping personnel could also use line trimmers over larger sections of grass where mowers might ordinarily be used.

U.S. Pat. No. 4,922,694 to Emoto shows a wheeled support for a line trimmer which consists of angled legs attached on the trimmer shaft midway between the handle and the cutting assembly. The device is designed to support the bulk of the trimmer weight and thereby alleviate user fatigue. However, because only two wheels are used, the Emoto device requires the user to maintain a constant height for the trimmer to achieve a uniformly cut lawn. This will be more difficult for the larger areas of grass. In addition, the Emoto device uses one-directional wheels; hence, it cannot be swept across a lawn in a semi-circular pattern. This will present a problem in the utility of the Emoto device since line trimmers are not designed to be pushed through grass like a lawn mower and would not easily cut large quantities of grass if they are pushed head-on into clumps of grass due to the drag on the cutting line.

U.S. Pat. Nos. 4,287,709 and 4,411,126 to Lowery et al., and 4,756,147 to Savell show examples of other devices designed to convert conventional line trimmers into lawn mowers. Each of the devices resemble a conventional lawn mower deck having an opening in the top center adapted to receive and secure the device to the safety guard or motor housing of an electric line trimmer. The devices are designed to support the trimmers and keep them at a constant height above the ground to insure an even cut over an entire lawn. However, once converted to a mower by these platform devices, the line trimmer can no longer access areas it used to trim (e.g., around trees, posts, and the like). This is because the platforms extend beyond the radius of extension of the line. Moreover, the platforms also block the user's view of the line, thereby requiring the user to turn the device over to determine if more line needs to be advanced from the spool.

U.S. Pat. No. 4,688,376 to Wolfe, Sr. discloses a wheeled tubular frame which, by design, supports only an electric line trimmer at a preset height above the ground. As with the above-described devices, the tubular frame is positioned beyond the radius of extension of the line and restricts the ability of the trimmer to closely approach and trim around obstacles in the lawn such as posts, fences, and trees. The height adjustment mechanism of the Wolfe, Sr., device is quite cumbersome. For example, the course height adjustment provided by the central cavity connecting to the electric motor housing will not allow for widely varying heights of grass to be cut since there is only a finite number of ways which the curved exterior housing can be securely gripped. In addition, the fine height adjustment at the castor wheels provided by the threaded screw members is not practical for lawn applications since the screw members may be caused to rotate simply from being pushed along the lawn's surface. Moreover, a person cannot easily determine the height at which the screw members have set the cutting assembly above the ground since he or she would be required to count the number of threads above the castor wheels.

SUMMARY OF THE INVENTION

It is an object of this invention to replace the safety guard of a line trimmer with a wheeled platform which allows a line trimmer to behave as a lawn mower while retaining its functionality as a line trimmer and edger.

It is another object of this invention to provide a wheeled platform for converting a line trimmer to a line trimmer/mower which is connectable to many different types of gasoline powered and electric powered line trimmers.

It is yet another object of this invention to provide a line trimmer with a connectable or connected wheeled platform which can be comfortably swept across a lawn in the same manner as is performed with line trimmers that do not have wheeled platforms attached thereto.

It is still another object of this invention to provide a line trimmer with a connectable or connected wheeled platform which has features that allow the line trimmer/mower to easily and accurately trim against the side of a long wall or other linear obstruction.

According to the invention, a line trimmer is either temporarily or permanently converted to a line trimmer/mower by a wheeled platform which is connected to the line trimmer near the rotating cutting assembly where line trimmer guard assemblies are ordinarily located. The platform has an opening which periodically exposes the cutting line each time it rotates through its 360° revolution. The opening is an important feature of this invention, and it permits the lawn trimmer/mower to neatly trim around trees, poles, shrubs, and the like, as well as trim against the side of a wall or other obstruction in a lawn, and allows the trimmer/mower to be used for edging adjacent a sidewalk or driveway in the same fashion as would be performed with ordinary line trimmers. The opening also allows users to quickly determine when additional line is required for trimming. The opening can be positioned at the front and left and right sides of the wheeled platform relative to the operator. The wheeled platform maintains the trimmer at a constant cutting height above the lawn and rolls on all-directional wheels. The wheels can swivel freely in any direction, but can also be advantageously locked in particular orientations which allow the line trimmer/mower to be moved over a grassy area in a sweeping pattern (sweep lock mode) or be aligned parallel with the side of a wall or other obstruction in a lawn to enable the platform to be easily guided alongside the wall or obstruction (track lock mode).

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

Figure 1:
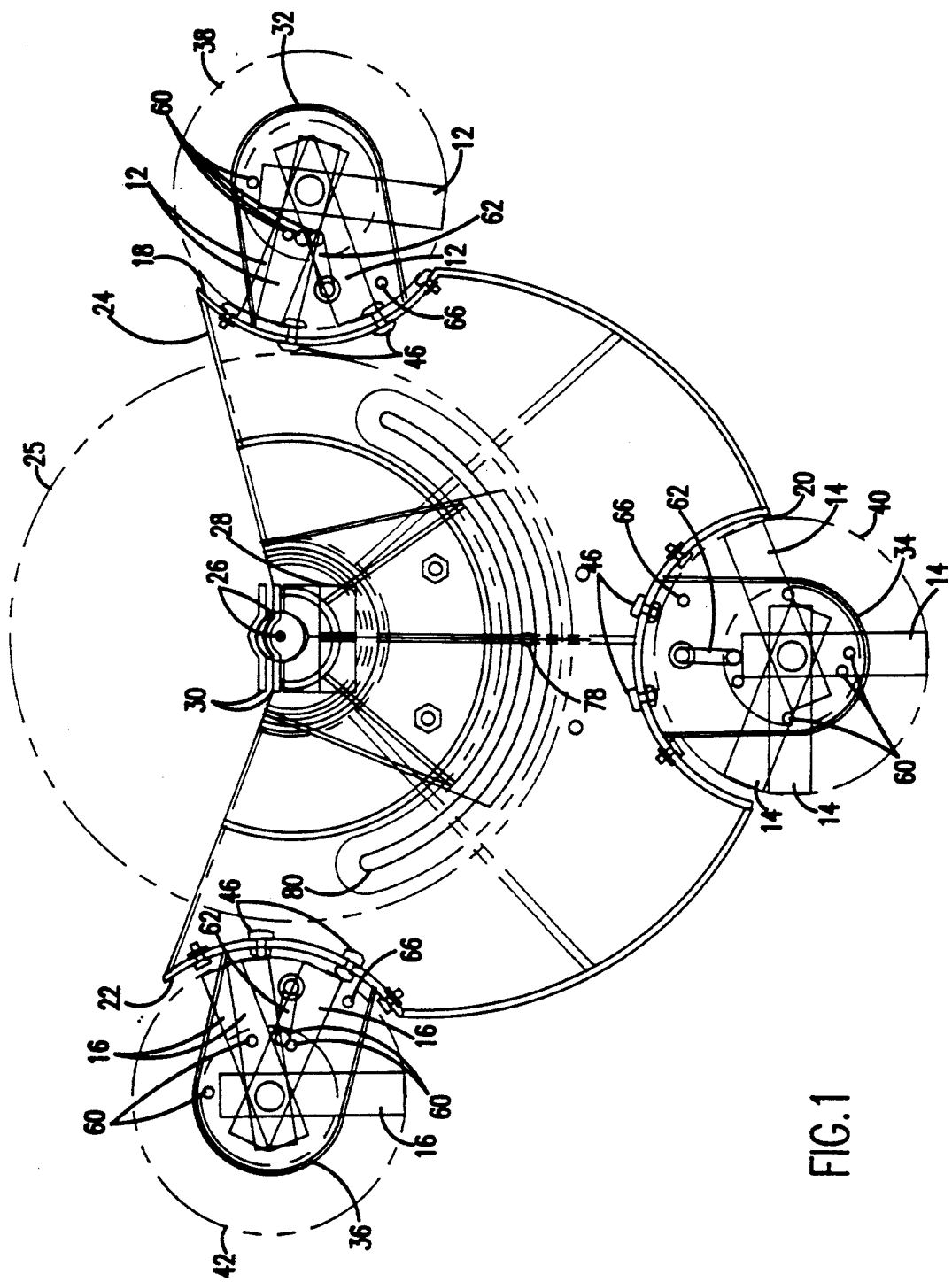
FIG. 1 is a top view of a wheeled platform for converting a line trimmer to a line trimmer/mower according to the present invention.

FIG. 1 shows a platform 10 with three wheels 12, 14, and 16 disposed in wheel wells 18, 20, and 22. The front of the platform has a wedged shaped opening 24. The wedge shaped opening 24 allows the line trimmer/mower of the present invention to retain its functionality as a line trimmer or edger, while having the added benefit of functioning as a lawn mower. Specifically, the radius of the cutting line, indicated by dashed circle 25, extends forward from the platform 10 in the wedge shaped opening 24; hence, the cutting line can be positioned to trim against the side of a wall, fence, or other obstruction in a lawn. In addition, the line trimmer/mower can be lifted by an operator and oriented with the wedge shaped opening positioned to allow the cutting line to strike the edge of a sidewalk or driveway. The wheels 12, 14, and 16 allow the platform 10 to move across a grassy area with the cutting assembly (not shown) held at an uniform height above the ground. Therefore, the line trimmer/mower of the present invention allows a line trimmer to cut grass and weeds at a uniform height and overcomes the problem of prior art line trimmer conversions which restrict the line trimmer's ability to trim and edge.

Figure 2:
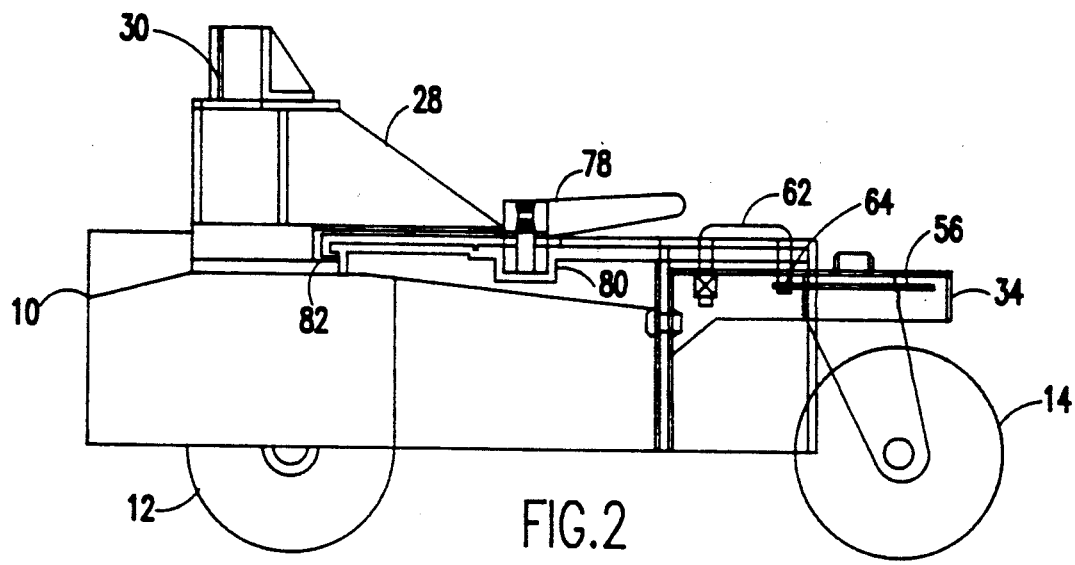
FIG. 2 is a cross-sectional side view of the wheeled platform of FIG. 1.
Figure 3A:
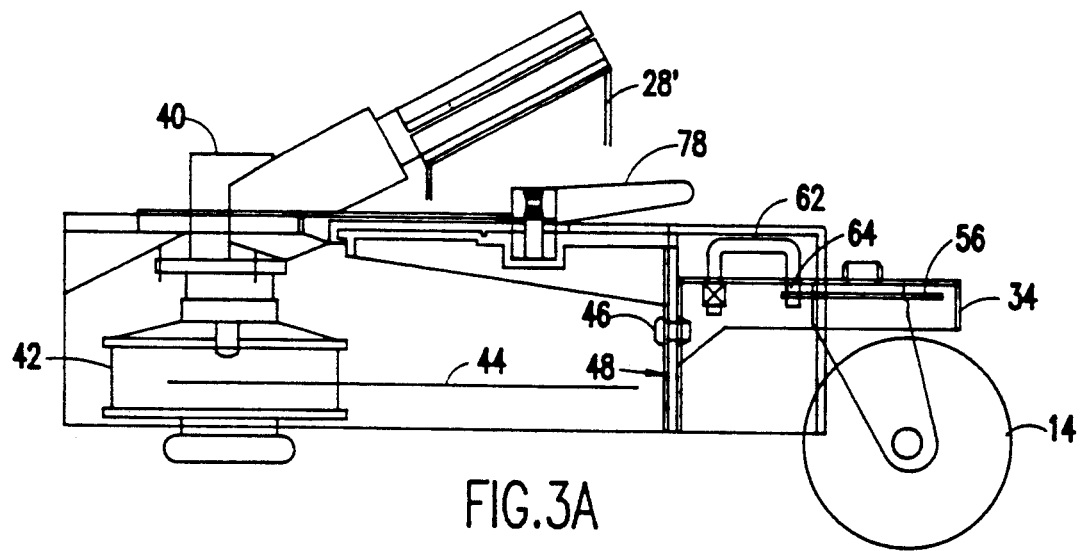
FIG. 3a and 3b are a cross-sectional side view of the wheeled platform of FIG. 1 with a straight shafted line trimmer connected, and a top view of the clamping structure, respectively.
Figure 3B:
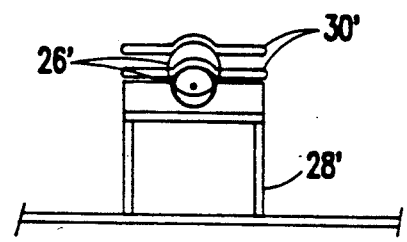

FIGS. 2 and 3a show cross-sectional views of a platform 10 with different clamping assemblies 28 and 28'. FIG. 2 shows the clamping assembly 28, also shown in FIG. 1, where the straight portion of a curved line trimmer shaft 26 is held perpendicular to the ground. With reference to FIGS. 1 and 2, it can be seen that the position of the plate 30 can be adjusted relative to the clamping assembly 28 to accommodate shafts 26 of smaller and larger diameters. FIG. 3a shows a straight shafted line trimmer 40 connected to the platform 10 by an angled clamping assembly 28'. The angled clamping assembly 28' orients the cutting assembly 42 of the straight shafted line trimmer 40 perpendicular to the ground so that the cutting line 44 can cut the grass and weeds at a uniform height. With reference to FIG. 3b, it can be seen that clamping assembly 28' is similar to clamping assembly 28 in that shafts 26' of different diameters can be securely connected to the platform between an plate 30' and the clamping assembly 28'.

Figure 6A:
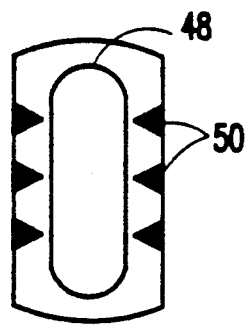
FIGS. 6a and 6b are plan views of indicia positioned at the slots in wheel wells of the platform, and indicia positioned on the shaft of a line trimmer, respectively.
Figure 6B:
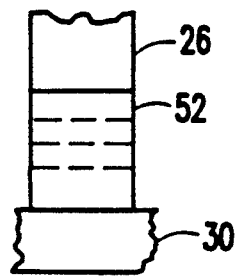

Adjusting the height of the cutting assembly can be accomplished by several means including: adjusting the position of the wheel holding assemblies 32, 34, and 36 relative to the platform 10, moving the shaft upwards or downwards in the clamping assembly 28 or 28', and using smaller or larger wheels 12, 14, and 16. With particular reference to FIGS. 1, 2, and 3a, it can be seen that wheel holding assemblies 32, 34, and 36 can be moved up and down relative to the platform 10 using screw connectors 46 that slide within slots 48 in the wheel wells 18, 20, and 22. This can easily be seen by contrasting FIGS. 2 and 3a. FIG. 6a shows that each slot 48 would be marked with indicia 50 so that the wheel assemblies 32, 34 and 38 could be accurately adjusted to the same level simply by tightening the screw connectors 46 at the same position relative to indicia 50. Other means for raising and lowering the wheel assemblies 32, 34, and 36, such as rack and pinion connections, etc., could also be employed. FIG. 6b shows that indicia strip 52 could be affixed to the shaft 26 of a line trimmer so that the height of the cutting assembly relative to the ground could be adjusted by correlating markings on the indicia strip 52 with the plate 30 that interacts with clamping assembly 28. FIGS. 1, 2 and 3a show that the wheels 12, 14, and 16 are positioned outside the platform 10; therefore, different diameter wheels can easily be connected to the line trimmer/mower of this invention and can be used to adjust the height of the cutting assembly relative to the ground.

It is contemplated that four inch diameter wheels 12, 14, and 16 will be optimum for most lawns; however, the ability to connect larger wheels is an important feature of this invention. It is difficult for smaller diameter wheels to traverse hilly and bumpy terrain. Specifically, a small diameter wheel can be snagged in a divot and thus prevent the line trimmer/mower from rolling freely across the ground. Adding large diameter wheels to the platform 10 can overcome this problem.

With reference to FIG. 1, the wheels 12, 14, and 16 are of the all directional variety (castor wheels, etc.) as is indicated by the dashed radius lines 38, 40, and 42 and the multiple positions for the wheels 12, 14, and 16. A very important feature of this invention is that the wheels 12, 14, and 16 can each be locked into a particular position relative to the platform 10. With reference to FIGS. 1, 2, and 3a, it can be seen that each of the wheels 12, 14, and 16 has a circular plate 54, 56, and 58 associated therewith. The circular plates 54, 56, and 58 have a plurality of holes 60 formed therein. A locking member 62, connected to each of the wheel assemblies 32, 34, and 36, has a free end 64 which is insertable in each of the holes 60. In addition, if it is desired to leave one or more wheels free to move in any direction, the wheel assemblies 32, 34, and 36, each include a hole 66 for retaining the free end 64 of locking member 62, thereby securing locking member 62 and not restricting the movement of the wheel and associated plate.

Figure 4A:
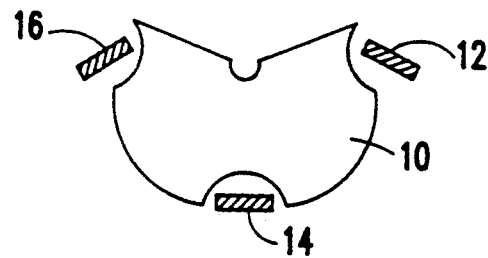
FIGS. 4a and 4b are schematic drawings of the wheeled platform with wheels locked to allow a sweeping motion.
Figure 4B:
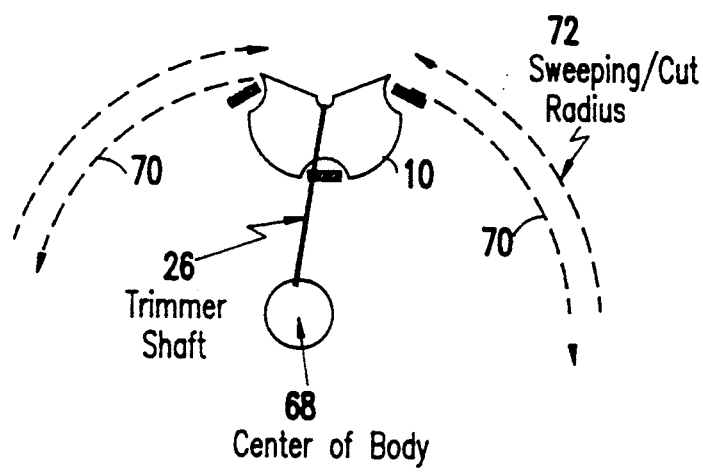
Figure 4C:
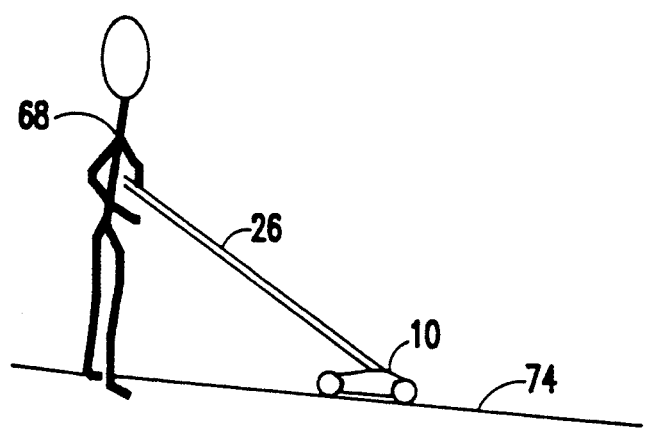
FIG. 4c is schematic drawing showing the wheeled platform being held by an operator.

FIGS. 4a–c demonstrate the line trimmer/mower invention in sweep-lock mode. Front wheels 12 and 16 are locked into position slightly offset from perpendicular to the line trimmer/mower shaft 26. It has been determined that a 9°–13° offset, and most preferably a 10°–11° offset, yields good sweeping results. The rear wheel 14 is locked into a perpendicular position relative to the shaft 26. FIG. 4b shows the person sweeps the platform 10 around his or her body 68 along arc 70, and grass or weeds are trimmed along sweeping/cut radius 72. FIG. 4c shows that the sweeping motion is most comfortable for the person 68 since the platform 10, person 68, and shaft 26 form a 3-4-5 triangle with the ground 74 and the person simply pivots about his or her waist to move the platform 10 in a sweeping motion.

Sweep cutting is a tremendous improvement over prior art line trimmer conversion packages. The mechanics of the cutting line are such that it is best operated by tangentially touching and cutting grass and weeds. If grass and weeds are forced directly into the line, the motor can become overburdened and the speed of line can slow or stop. Therefore, prior art conversion packages for line trimmers that have fixed wheels that only move in a forward direction have an inherent design defect. Likewise, the present invention, with lockable wheels for sweep-cutting, constitutes a substantial improvement over the castor wheel design of U.S. Pat. No. 4,688,376 to Wolfe, Sr. Specifically, if wheels are permitted to rotate freely as they are in the Wolfe, Sr. design, a sweeping motion cannot be achieved since the wheels would flip back and forth to change direction at the ends of each sweeping arc 70. This flipping action significantly increases the effort required of the line trimmer/mower operator and slows the sweeping process.

Figure 5A:
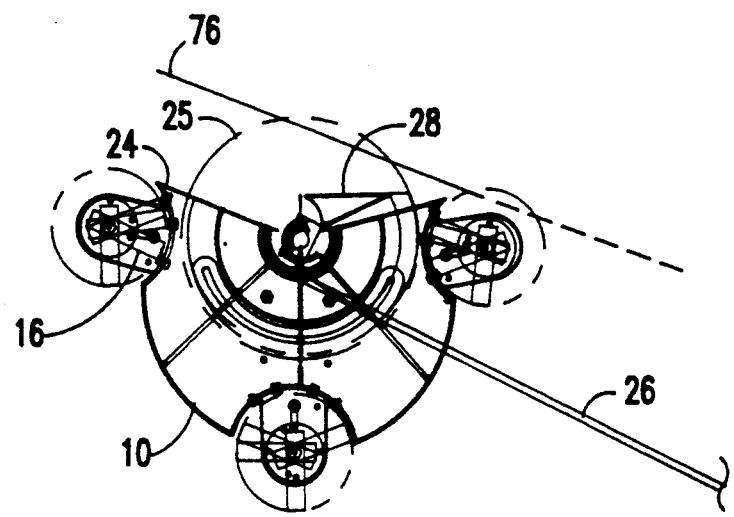
FIGS. 5a and 5b are schematic drawings of the wheeled platform arranged to be moved alongside a wall or fence for trimming operations.
Figure 5B:
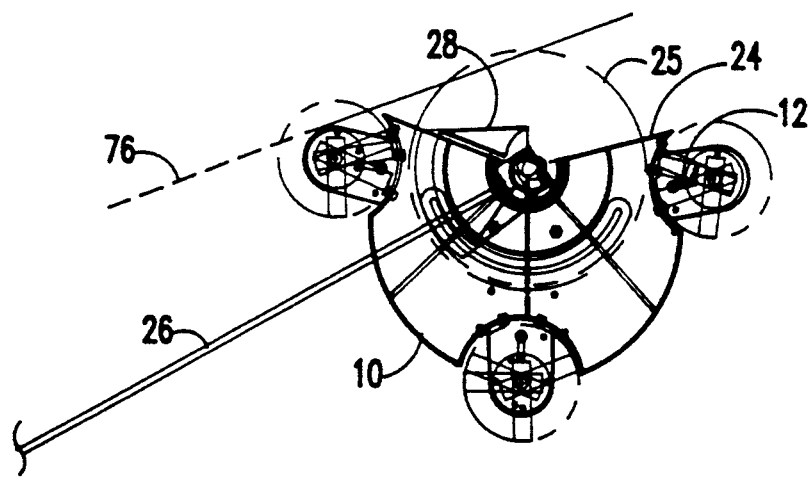

FIGS. 5a and 5b demonstrate the line trimmer/mower invention in a wall or fence trimming mode. Specifically, FIG. 5a shows the platform 10 being guided to the left up a wall or fence 76 by locking the front wheel 16 parallel with the wall or fence 76 and pushing the platform 10 straight along the wall or fence 76, and FIG. 5b shows the platform 10 being guided to the right up the wall or fence 76 by locking the front wheel 12 in parallel with the wall or fence. It has been observed that only the lead wheel 12 or 16 needs to be locked into position to provide adequate trimming against the wall or fence 76, and that the two remaining wheels can remain unlocked. However, if desired, the two remaining wheels may also be locked into a position parallel to the wall or fence 76. Indicators could be provided on the wheel assemblies 32, 34, and 36 for allowing the user to quickly orient the wheels 12, 14, and 16, relative to the platform 10. Trimming against a wall or fence 76 is accomplished by moving the platform forward and backward along a parallel line dictated by the locked wheel 12 or 16. It can be observed from FIGS. 5a and 5b that the grass and weeds are not directly fed into the cutting line; rather, the cutting line contacts the grass and weeds tangentially, as is indicated by the cutting line radius 25. Therefore, the wall or fence trimming mode does not unduly tax the motor performance of the line trimmer/mower, and provides a superior trimming function. Furthermore, FIGS. 5a and 5b show that the opening 24 in the platform 10, and the locked front wheel 12 or 16, respectively, are positioned to allow the cutting radius 25 of the line to extend beyond the wall 76; therefore, weeds and grass against the wall 76 can be cut quite easily. Obviously, other obstructions in a lawn besides walls or fences can be advantageously trimmed using this mode of operation. When trimming along any wall or obstruction, having the forward wheel 12 or 16 in a track lock mode is important when the user is pushing the wheeled platform 10 forward, because an unlocked, multidirectional, castor wheel would force the user to guide the device in addition to pushing, and the user would constantly be required to compensate for bumps and divots in the grass.

FIGS. 1, 2, 3a, 5a, and 5b also show another important feature of this invention whereby the clamping assembly 28 or 28' is rotatable relative to the platform 10. Specifically, the clamping assembly 28 or 28' has a twist lock member 78 that rides within a slot 80 in the platform 10. FIG. 2 shows the clamping assembly 28 has a flange 82 that fits over the front of the platform 10 and the twist lock member 78 secures the clamping assembly 28 to the platform 10. Curve shafted and straight shafted line trimmers can be secured to the platform 10 simply by removing clamping assembly 28 and replacing it with clamping assembly 28'. FIG. 1 shows the clamping assembly 28 centrally located relative to the platform 10, and this is the best position for performing sweep cutting of grassy areas. FIGS. 5a and 5b show the clamping assembly 28 oriented to the right and left sides of the platform 10, respectively. This is accomplished by loosening the twist lock member 78, sliding the twist lock member 78 within the slot 80 to the left or right side, and then tightening the twist lock member 78 to securely hold the clamping assembly 28 in the desired orientation. This ability to move the clamping assembly 28 is important for the wall and fence trimming mode since it enables the operator to stand behind the platform 10 as he or she moves the platform 10 forward and backward parallel to the wall or fence 76. Standing behind the platform 10 is much more comfortable for the operator and makes the parallel movement of the platform 10 much easier to perform. FIGS. 5a and 5b show the shaft 26 extends from the clamping assembly 28 to a location that allows a user to easily walk parallel to wall 76.

Figure 7:
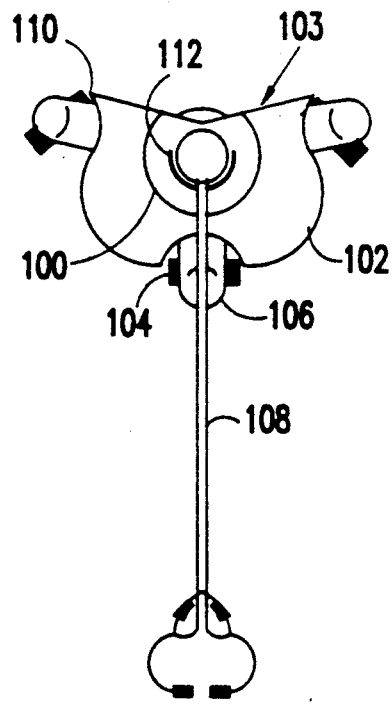
FIG. 7 is a top view of a line trimmer/mower where the trimmer and wheeled platform are formed into an inLegral unit.

While the invention has been described above in terms of a platform 10 connectable to the shaft of a power line trimmer, it should be understood that the unit can be integrally formed. FIG. 7 shows the motor housing 100 of an electric line trimmer connected to platform 102 with wedge shaped opening 103. The platform 102 has a plurality of wheels 104 positioned there around for supporting cutting assembly at a uniform height above the ground. As described above in conjunction with FIGS. 1, 2, and 3a, the wheels 104 would be all directional and would be selectively lockable into a position using locking members 106 to allow for sweep-lock and wall or fence trimming modes of operation which are described in conjunction with FIGS. 4a–c and FIGS. 5a–b above, respectively. In addition, the motor housing 100 could be rotatable relative to the platform 102 so that the handle 108 could be positioned to the left or right side of the platform 102 for enhancing the wall or fence trimming functionality. This would be accomplished using a twist lock member 110 and slot 112 configuration similar to that described above in conjunction with FIG. 1, 2, 3a, 5a, and 5b. Alternative configurations would also be possible such as, for example, a design where the shaft of the line trimmer/mower is rotatable relative to the motor housing/platform. With an integral line trimmer/mower, other mechanisms for locking the wheels 104 and rotating the handle 108 would be possible, including being able to operate these mechanisms from the handle 108.

Figure 8A:
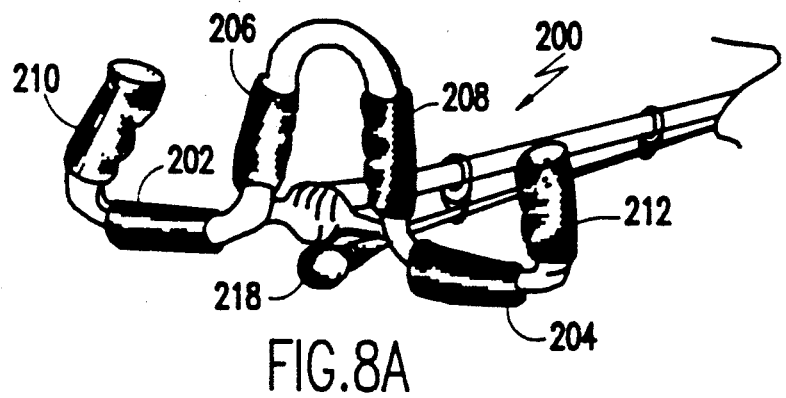
FIGS. 8a and 8b are isometric views of a handle bar assembly which promotes the use of the line trimmer/mower in a sweeping motion (sweep lock mode), and a forearm attachment connectable to the handle bar assembly, respectively.
Figure 8B:
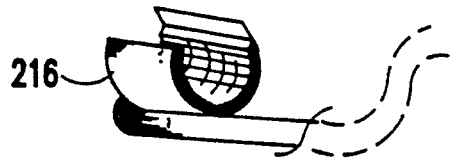

FIG. 8a shows a handle bar assembly 200 which can be best used with line trimmer/mower of the present invention which includes multiple hand positions for the different modes of operation, e.g., sweep lock mode, track lock mode, etc. As an example, handles 202 and 204 are positioned for pushing and pulling as would be performed when the platform is being operated in a track lock mode, handles 206 and 208 are positioned for use when the platform is being swept along a full arc as shown in FIG. 4b (sweep lock mode), and handles 210 and 212 are positioned for use when the platform is being swept along a short, or partial arc, as would be the case when the operator is sweeping to the left or right of his/her body, where handle 206 is used in conjunction with handle 212 and handle 210 is used in conjunction with handle 208. FIG. 8b shows a forearm support 216 which can be connected in place of the handles 210 and 212. The forearm support 216 would be used in conjunction with the handles 206 and 208 while in the sweep lock mode. With reference back to FIG. 8a, control 218 can be positioned at the handle bar assembly 200 for locking and unlocking the mechanisms that allow moving the shaft relative to the opening in the wheeled platform.

While the invention has been described in terms of its preferred embodiments, those skilled in the art will recognize that the invention can be practiced with modification within the spirit and scope of the appended claims.

Having thus described my invention, what I claim as new and desire to secure by Letters Patent is as follows:

1. A line trimmer/mower device, comprising:
    a platform for housing a cutting head of a line trimmer, said platform having an opening which exposes a cutting line extending from said cutting head for a portion of its 360° rotation;
    wheels connected to said platform at opposite sides of said opening, said wheels supporting said cutting head of said line trimmer above a ground surface and allowing said cutting head to move over said ground surface at a uniform height above said ground surface;
    means for holding a shaft of said line trimmer projecting from said platform in a direction opposite said opening in said platform and on a line which divides said wheels connected to said platform at opposite sides of said opening; and
    means for maintaining each of said wheels connected to said platform at opposite sides of said opening oriented to roll on a line offset from perpendicular to said shaft of said line trimmer wherein a first wheel is connected to said platform on a first side of said opening and is oriented to roll on a first line and a second wheel is connected to said platform on a second side of said opening and is oriented to roll on a second line with said first and second lines being offset from perpendicular to said shaft of said line trimmer by equal and opposite angular degrees,
    said means for maintaining allowing said platform to move over said ground surface along an arcuate path in a sweeping motion as said wheels traverse said ground surface, and
    said means for maintaining preventing said first and second wheels from rotating about an axis perpendicular to said first and second lines.

2. A line trimmer/mower device as recited in claim 1 wherein said platform has an outer perimeter, said platform further comprising a means for connecting said wheels to said platform at opposite sides of said opening and spaced away from said outer perimeter of said platform in a plane with said platform to allow wheels of larger diameter than a height between said ground surface and said platform to be connected to said platform by said means for connecting, said wheels supporting said cutting head of said line trimmer above a ground surface and allowing said cutting head to move over said ground surface at a uniform height above said ground surface.

3. A line trimmer/mower device as recited in claim 1 wherein said means for maintaining can maintain said wheels connected to said platform at opposite sides of said opening to roll 9°-13° from perpendicular to said shaft.

4. A line trimmer/mower device as recited in claim 1 further comprising means for orienting said shaft at different positions relative to said opening in said platform.

5. A line trimmer/mower device as recited in claim 1 wherein said wheels are connected to said platform in wheel wells formed in said platform and further comprising a means to adjust a relative height of each of said wheels relative to said wheel wells in said platform.

6. A line trimmer/mower device as recited in claim 5 wherein said wheel wells are located at an outside wall of said platform.

7. A line trimmer/mower device, comprising:
 a platform for housing a cutting head of a line trimmer, said platform having an opening which exposes a cutting line extending from said cutting head for a portion of its 360° rotation;
 wheels capable of moving in all directions connected to said platform at opposite sides of said opening, said wheels supporting said cutting head of said line trimmer above a ground surface and allowing said cutting head to move over said ground surface at a uniform height above said ground surface, a first wheel of said wheels being connected on a first side of said opening in said platform, and a second wheel of said wheels being connected on a second side of said opening in said platform;
 means for selectively orienting a shaft of said line trimmer projecting from said platform between said first and second wheels in at least two different positions relative to and extending away from said opening in said platform, a first position of said two positions being closer to said first wheel than said second wheel, and a second position of said two positions being closer to said second wheel than said first wheel; and
 means for locking each of said first and second wheels to roll only on one path,
 said means for selectively orienting said shaft and said means for locking being operable to accommodate alternate configurations where
 (i) said shaft is in said first position and said second wheel is locked, whereby said second wheel is leading said cutting head of said line trimmer and said shaft is positioned behind said cutting head of said line trimmer, and
 (ii) said shaft is in said second position and said first wheel is locked, whereby said first wheel is leading said cutting head of said line trimmer and said shaft is positioned behind said cutting head of said line trimmer.

8. A line trimmer/mower device as recited in claim 7 further comprising a handlebar assembly with a first set of hand grips positioned for pushing and pulling said platform and a second set of hand grips positioned for sweeping said platform.

9. A line trimmer/mower device as recited in claim 7 wherein said wheels are connected to said platform in wheel wells formed in said platform and further comprising a means to adjust a relative height of each of said wheels relative to said wheel wells in said platform.

10. A line trimmer/mower device as recited in claim 9 wherein said wheel wells are located at an outside wall of said platform.

11. A line trimmer/mower device as recited in claim 7 wherein said platform has an outer perimeter, said platform further comprising a means for connecting said wheels to said platform at opposite sides of said opening and spaced away from said outer perimeter of said platform in a plane with said platform to allow wheels of larger diameter than a height between said ground surface and said platform to be connected to said platform by said means for connecting, said wheels supporting said cutting head of said line trimmer above a ground surface and allowing said cutting head to move over said ground surface at a uniform height above said ground surface.

* * * * *